(12) United States Patent
Yamaoka et al.

(10) Patent No.: US 7,715,975 B2
(45) Date of Patent: May 11, 2010

(54) ENGINE CONTROL SYSTEM AND CONTROL METHOD THEREOF

(75) Inventors: Shiro Yamaoka, Hitachi (JP); Yoshihiro Sukegawa, Hitachi (JP); Noboru Tokuyasu, Hitachinaka (JP); Hiroaki Hoshika, Hitachiohmiya (JP); Kaori Kashio, Sakura (JP)

(73) Assignee: Hitachi, Ltd., Tokyo (JP)

( * ) Notice: Subject to any disclaimer, the term of this patent is extended or adjusted under 35 U.S.C. 154(b) by 72 days.

(21) Appl. No.: 12/277,888

(22) Filed: Nov. 25, 2008

(65) Prior Publication Data

US 2009/0143959 A1     Jun. 4, 2009

(30) Foreign Application Priority Data

Nov. 30, 2007   (JP)   ............... 2007-309640

(51) Int. Cl.
*B60T 7/12*   (2006.01)
*F02M 7/00*   (2006.01)

(52) U.S. Cl. .............. 701/103; 701/108; 123/435; 123/672

(58) Field of Classification Search ......... 701/103–105, 701/108, 109, 114, 115; 123/434, 435, 672, 123/673, 674, 676
See application file for complete search history.

(56) References Cited

U.S. PATENT DOCUMENTS 6,584,392 B1 * 6/2003 Jankovic et al. ............ 701/54
6,763,708 B2 * 7/2004 Ting et al. ............ 73/114.74
7,380,400 B2 * 6/2008 Barbe et al. ............ 60/605.2
2008/0022677 A1 * 1/2008 Barbe et al. ............ 60/599
2009/0223495 A1 * 9/2009 Ohata et al. ............ 123/568.12

FOREIGN PATENT DOCUMENTS

JP     2003-27997     1/2003

* cited by examiner

*Primary Examiner*—John T Kwon
(74) *Attorney, Agent, or Firm*—Crowell & Moring LLP (57) ABSTRACT

An engine that re-circulates its exhaust gas suffers decreased accuracy in estimating an EGR rate real-time especially while the operating state of the engine is in a transitional state, which often results in torque fluctuations and deteriorated exhaust gas.

A sensor for directly detecting an EGR flow rate is disposed in an EGR path. An EGR rate and in-cylinder oxygen concentration are calculated from the output value of that sensor. In addition, when this EGR rate calculation method is used, the calculation is properly switched between a steady operation state characterized by a low load and small rotational fluctuations and a transitional operating state including the acceleration and deceleration. This makes it possible to correctly estimate the EGR rate and the in-cylinder oxygen concentration under a wide range of engine operation conditions, and thereby to avoid the fluctuation of torque and the deterioration of exhaust gas.

19 Claims, 12 Drawing Sheets

ENGINE COOLING WATER

FIG.13

ENGINE CONTROL SYSTEM AND CONTROL METHOD THEREOF

BACKGROUND OF THE INVENTION

1. Field of the Invention

The present invention relates to a control technology and method of an engine equipped with an exhaust gas recirculation (hereinafter referred to as "EGR") apparatus that returns part of exhaust gas to an intake pipe.

2. Description of the Related Art

In the field of diesel engines, and the like, there is known a technology for concurrently reducing soot and NOx by using the effect of reducing the combustion temperature based on the application of the exhaust gas recirculation (EGR), and the effect of uniformalizing a mixture gas by increasing an ignition delay period. The combustion temperature and the ignition delay period are influenced by the in-pipe inert gas ($CO_2$) concentration and the in-cylinder oxygen concentration that change by the introduction of EGR. Therefore, in order to carry out the engine control, it is important to correctly detect/estimate not only the EGR rate but also the inert gas concentration or the in-cylinder oxygen concentration. For example, as an estimation method for estimating the in-cylinder oxygen concentration, JP-A-2003-27997 discloses a technology for determining the control amount relating to fuel injection. According to this technology, the control amount is determined by detecting the exhaust gas oxygen concentration by an $O_2$ sensor, and then by estimating the in-cylinder oxygen concentration by use of the exhaust gas oxygen concentration.

SUMMARY OF THE INVENTION

However, the technology of the invention disclosed in JP-A-2003-27997 has problems as described below. To be more specific, the $O_2$ sensor has a problem of the detection responsiveness to a change in oxygen concentration. At the time of the transient operation such as rapid acceleration and rapid deceleration, it is difficult for the $O_2$ sensor to correctly estimate not only the oxygen concentration in EGR but also the in-cylinder oxygen concentration. In addition, in order to correctly determine the in-cylinder oxygen concentration from a detection value of the $O_2$ sensor, and the like, it is necessary to make a calculation from the oxygen concentration of a gas in which EGR is mixed with intake air. Accordingly, information including the amount of intake air is required. An airflow sensor for detecting the amount of intake air is disposed at a position that is spaced away from an engine combustion chamber by the constant distance. Moreover, components including a throttle, an intercooler, and a supercharger exists therebetween. In such a state, in the transient operation described above, the detected amount of air does not coincide with the amount of air that is actually taken into a pipe. Accordingly, it is difficult to correctly estimate an actual EGR rate and the actual in-cylinder oxygen concentration. Because particularly a diesel engine is easily subjected to the engine deterioration and the fouling, it becomes more difficult to correctly estimate the EGR rate and the in-cylinder oxygen concentration in such circumstances.

The present invention has been made in consideration of the problems as described above. An object of the present invention is to provide a system for controlling an engine, which employs EGR, by correctly estimating an EGR rate and the in-cylinder oxygen concentration even in a transitional operating state particularly including the acceleration and deceleration, and even in the case of the engine deterioration.

In order to solve the above-described problems, the present invention provides an engine control system that includes an EGR flow sensor for directly detecting a flow rate of an EGR gas passing through an EGR path. The engine control system further includes: first EGR rate estimation means for estimating an EGR rate on the basis of an output value of the EGR flow sensor and an output value of an intake airflow sensor; and second EGR rate estimation means for estimating an EGR rate on the basis of the intake pressure and an output value of the EGR flow sensor. Preferably, when an operation state of an engine is a steady state, the engine control is performed on the basis of the result of the estimation by the first EGR rate estimation means. In contrast, when the operation state of the engine is a transient state, the engine control is performed on the basis of the result of the estimation by the second EGR rate estimation means. In addition, the in-cylinder oxygen concentration is calculated from the estimation result of the EGR rate, and each engine parameter is then controlled on the basis of the result. This makes it possible to achieve the suitable engine combustion control. Incidentally, from the viewpoint of the responsiveness and the resistance to fouling, it is desirable that the above-described EGR flow sensor be a hot-wire-based flow sensor.

The first EGR rate estimation means described above is capable of highly accurate detection in the steady operation. In contrast, the second EGR rate estimation means is superior in the responsiveness in the transient operation. By properly switching between the first and second EGR estimation means in response to various kinds of operation states of the engine, the EGR rate can be suitably estimated. As a result, the engine combustion control in which the fluctuation of the engine torque and the deterioration of exhaust gas are kept suppressed can be achieved. At the same time, it also becomes possible to keep the long-term durability performance of the EGR flow sensor at a high level in EGR atmosphere that is easily subjected to fouling in comparison with air environment.

According to the present invention described above, even in the transient operation particularly including the acceleration and deceleration, and even in the case of the engine deterioration, an engine employing EGR can correctly estimate an EGR rate and the in-cylinder oxygen concentration. Therefore, the engine combustion control, which is superior in the exhaustion, the fuel efficiency, and the output under various engine operation conditions, can be achieved.

DESCRIPTION OF THE PREFERRED EMBODIMENTS

Embodiments of the present invention will be described below with reference to the accompanying drawings.

Figure 1:
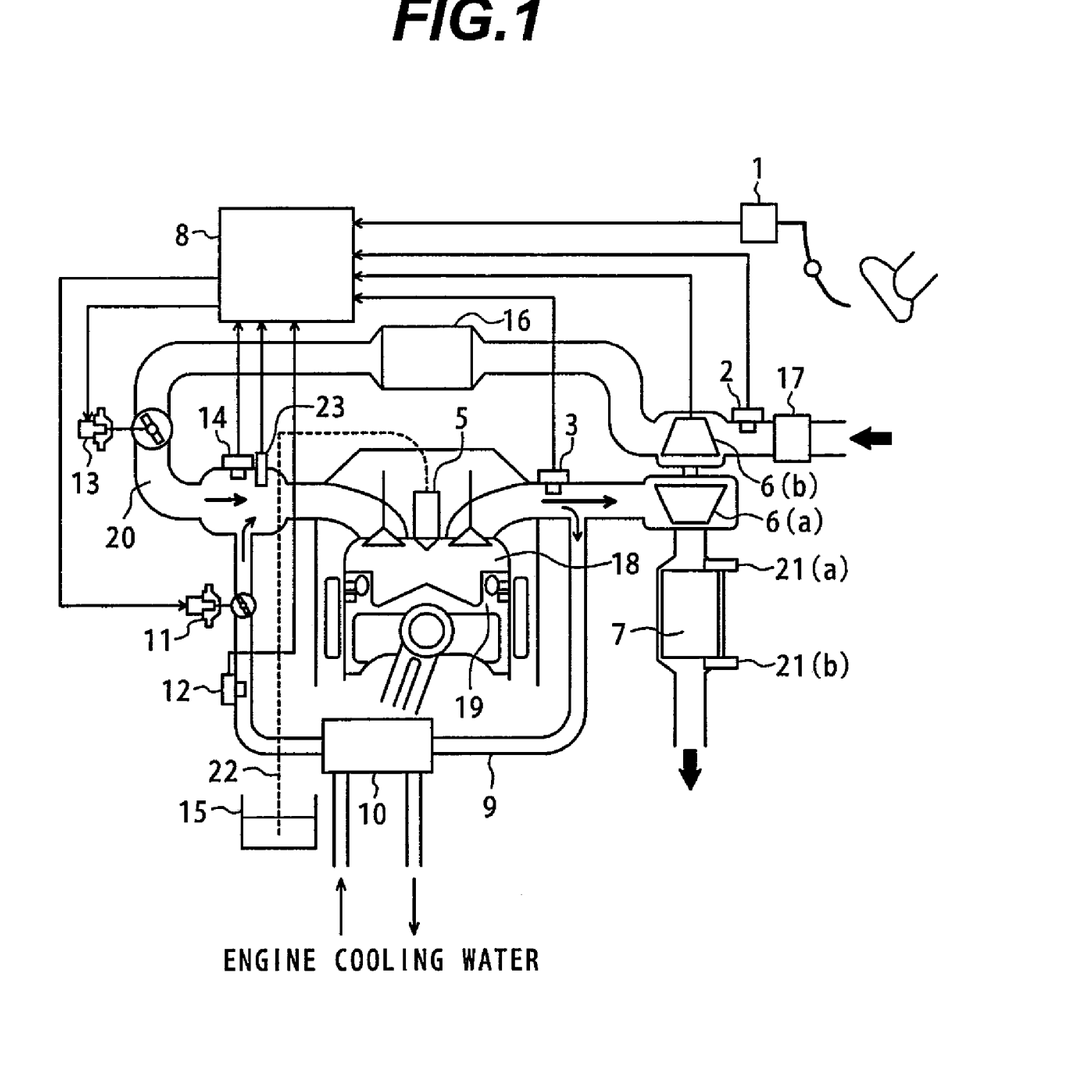
FIG. 1 is a diagram illustrating a configuration of an engine control system according to a first embodiment of the present invention.

FIG. 1 is a diagram illustrating the configuration of an engine control system according to a first embodiment of the present invention.

In FIG. 1, reference numeral 19 denotes an engine. Disposed from upstream to downstream with respect to the engine 19 are an air cleaner 17; an airflow sensor 2; a compressor 6(b) of a supercharger; an intercooler 16; a throttle 13 for adjusting the amount of intake air; an intake port 20; and a fuel injection valve (hereinafter referred to as an "injector") 5. In this embodiment, intake air amount control means is composed of the compressor 6(b), the intercooler 16, and the throttle 13; intake air amount detection means corresponds to the airflow sensor 2. Reference numeral 8 denotes an engine control unit (hereinafter referred to as "ECU"). The ECU 8 determines the combustion mode, control variables, or the like of the engine 19 based on the driver's requests such as for an accelerator opening angle α and braking amount; vehicle states such as the vehicle speed; and engine operational conditions such as the temperature of engine coolant and that of exhaust gas. The injector 5 directly injects fuel into a combustion chamber 18; the injector 5 is connected to a fuel tank 15 through a fuel pipe 22. The fuel is transferred to the injector 5 by a feed pump (not illustrated) located in the fuel tank 15 and a high-pressure fuel pump (not illustrated) that is disposed between the fuel pipe 22 and the injector 5. In response to a target engine torque calculated from the opening signal α of an accelerator opening sensor 1, a specified amount of fuel is injected into the combustion chamber 18 at a specified fuel injection time. These parameters associated with fuel injection are properly corrected on the basis of an opening signal θtp of the throttle 13, an opening signal θegr of an EGR control valve 11, a charging pressure Ptin of the compressor 6(b), an output value of a lambda (λ) sensor 3, and the like. The lambda sensor 3 measures the air-fuel ratio of engine exhaust gas. It should be noted that an oxygen sensor or a $CO_2$ sensor may also be used for that purpose so long as they are capable of estimating the air-fuel ratio of exhaust gas or the concentration of oxygen in the exhaust gas. The throttle 13 is preferably an electronically-controlled throttle for driving a throttle valve by an electrically-driven actuator. The intake port 20 is provided with an intake pressure sensor 14 that is used as means for detecting the pressure inside the intake port 20. An exhaust pipe is provided with: an EGR path 9 for recirculating exhaust gas to the intake port 20; an EGR cooler 10; and an EGR control valve 11. An EGR flow sensor 12 for detecting the flow rate of the recirculated exhaust gas is disposed in the EGR path 9. In this embodiment, this EGR flow sensor 12 directly detects the EGR flow rate at least once during one engine combustion cycle regardless of engine operating conditions, and a hot-wire flow sensor or an electromagnetic flow sensor is preferably used as that sensor. This makes it possible to detect an EGR flow rate with high accuracy and to use the accurate EGR flow rate for the engine control.

Figure 2A:
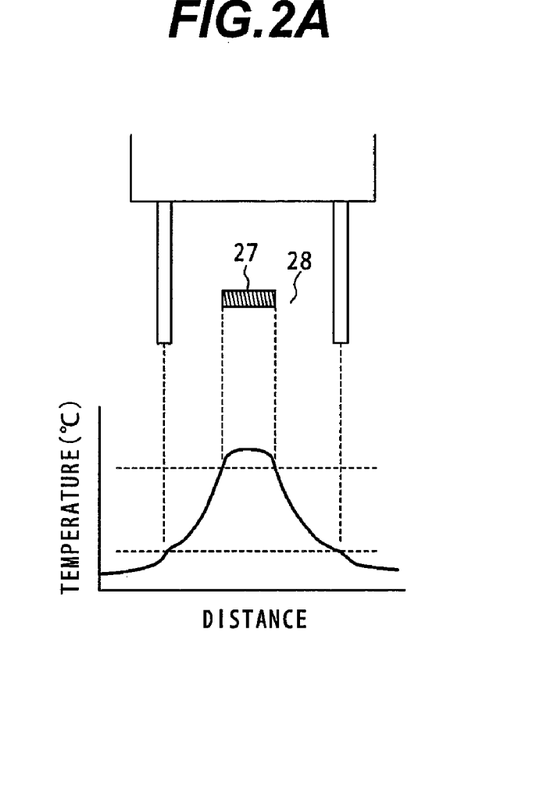
FIGS. 2A, 2B are conceptual diagrams each illustrating a measuring method (hot-wire-based) of an EGR flow sensor according to the first embodiment of the present invention.
Figure 2B:
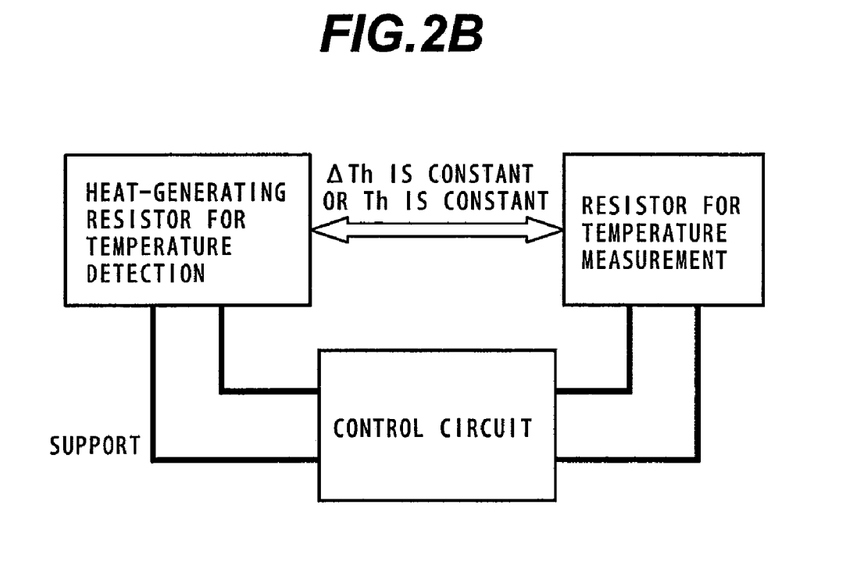

Next, as a representative example of the measurement principles used for the EGR flow sensor according to the present invention, the principles of the hot-wire flow sensor will be described with reference to FIGS. 2A and 2B. In this embodiment, it is desirable that this hot-wire flow sensor be used as the EGR flow sensor 12. This method uses two heat-generating resistors: one is a resistance thermometer used for measuring the temperature of gas; and the other is a resistor set at a temperature higher than that of the resistance thermometer. The two heat-generating resistors are controlled such that the difference in temperature between them is always kept constant. As shown in FIG. 2A, the hot-wire flow sensor is configured to include a hot wire 27 and a lead wire 28. Also, as shown in FIG. 2B, a particular current control state when a control circuit controls the temperatures of the two wires 27 and 28 is used to detect the amount of intake gas. The hot-wire flow sensor configured as above ensures high output responsiveness to changes in gas flow rate. At present, most of intake air flowmeters used for automobiles are hot-wire flowmeters.

Deterioration in output characteristics of a flowmeter due to fouling is a serious problem irrespective of whether the flowmeter is used in an intake environment or in an exhaust environment. In particular, adhesion of a fouling material such as PM to the hot wire 27 results in a substantial change in output from the sensor. This makes it impossible to correctly detect the amount of gas. Therefore, in order to prevent the fouling, the EGR flow sensor 12 according to the present invention is controlled such that the temperature of the hot wire 27 is temporarily increased up to a level at which PM is burned away. This makes it possible to burn away adhering fouling materials such as PM and also to prevent a new fouling material and exhaust-condensed water from adhering. In this case, in consideration of the Leidenfrost effect for avoiding the adhesion of fouling materials, it is desirable that the temperature of the hot wire 27 be increased to 600° C. or higher. However, because an exhaust gas level differs from engine to engine, the present invention is not limited to that temperature range.

Figure 3:
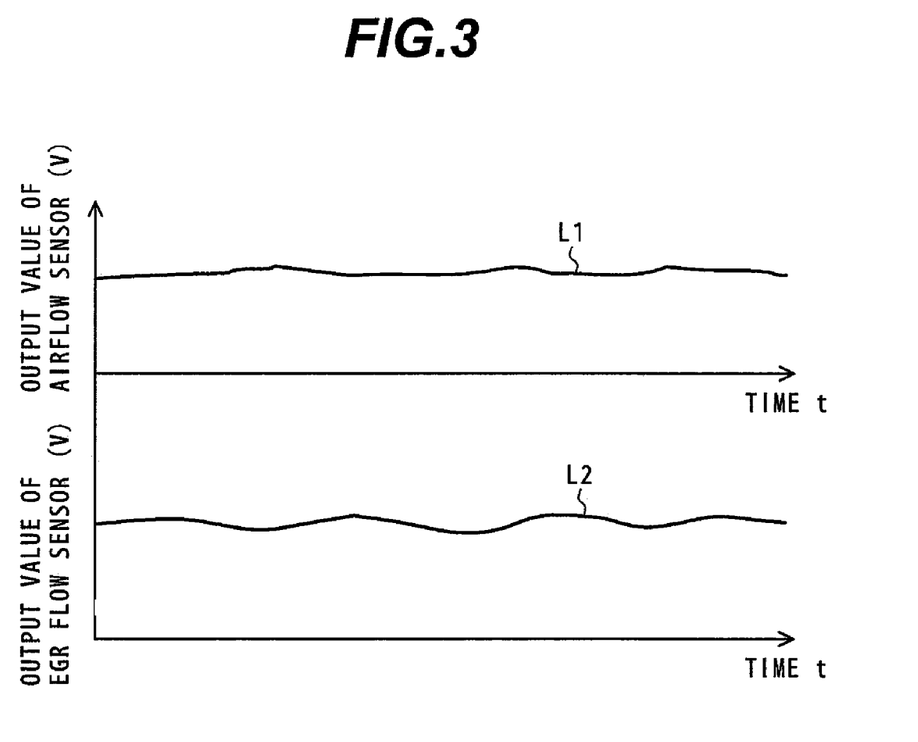
FIG. 3 is a diagram illustrating an example of output values of the EGR flow sensor shown in FIG. 2 in comparison with an output value of an airflow sensor.

FIG. 3 is a diagram illustrating, as an example, output waveforms of the airflow sensor 2 and the EGR flow sensor 12 under a certain operational condition of the engine 19. In FIG. 3, hot-wire flow sensors are used as the airflow sensor 2 and EGR flow sensor 12, and the waveforms of these sensors 2 and 12 are represented by L1 and L2, respectively. These sensors are capable of measurement with a responsiveness ranging from hundreds of microseconds to several milliseconds. In the case of steady conditions, both of the airflow sensor 2 and the EGR flow sensor 12 output waveforms with small fluctuations as indicated by L1 and L2. However, the amplitudes and frequencies of the waveforms may differ depending on where the airflow sensor 2 and the EGR flow sensor 12 are located. In particular, because the EGR flow sensor 12 is located in a pipe that constitutes the EGR path 9 that communicates with the intake port 20 and the exhaust pipe, it is likely that the pulses of intake air and exhaust gas will be detected. In this case, the pulse frequency of L2 is 0.5 times as large as that of L1. These pulses are subjected to signal processing in the ECU 8, whereby a proper intake airflow Qa and EGR flow rate Qegr can be acquired. Described next with reference to FIG. 4 is a flowchart in which the ECU 8 calculates an EGR rate on the basis of the above-mentioned values of Qa and Qegr.

Figure 4:
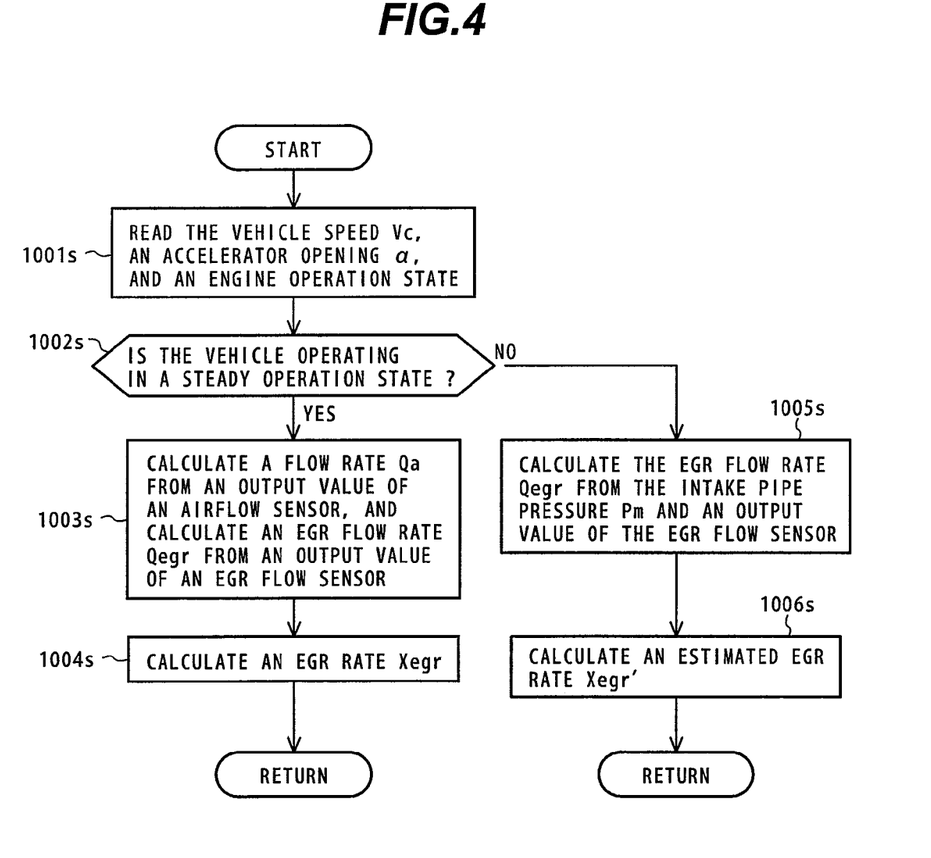
FIG. 4 is a flowchart illustrating an example of switching between first EGR rate estimation means and second EGR rate estimation means according to the first embodiment of the present invention.

FIG. 4 is a flowchart illustrating an example of EGR rate calculation according to the first embodiment of the present invention. First, in block 1001s, information about the vehicle equipped with the engine 19 is read. The information includes a vehicle speed Vc, an accelerator opening α, and an engine operational state. These pieces of information are used to judge whether or not the vehicle is operating in a steady operation state (block 1002s). The 'steady operation state' as used herein refers to a state in which rates of change in the accelerator opening α and in the vehicle speed Vc are almost 0 or considerably small. For example, the steady operation state is a state in which the vehicle equipped with the engine 19 travels at a substantially constant speed. If it is judged in block 1002s that the vehicle is operating in the steady operation state, the processing proceeds to block 1003s. Then, from the output values of the airflow sensor 2 and the EGR flow sensor 12, a mass flow rate Qa of intake air and an EGR mass flow rate Qegr are calculated so that an EGR rate Xegr is calculated (block 1004s). The EGR rate Xegr can be calculated as follows:

$$Xegr = Qegr/(Qa+Qegr) \quad \text{(Equation 1)}$$

Thus, the use of the EGR flow sensor 12 allows for a simple and accurate calculation of the EGR rate Xegr.

In addition, in block 1002s, if the engine 19 is not operating in the steady state (more specifically, if the engine 19 is operating in a transitional operating state in which a rate of change in accelerator opening α and a rate of change in vehicle speed Vc are large), the process proceeds to block 1005s. An EGR rate Xegr' is then calculated from an output value Pm of the intake pressure sensor 14 and an EGR mass flow rate Qegr based on an output value of the EGR flow sensor (block 1006s). Thus, according to the present invention, when the engine 19 is operating in the transitional operating state, the calculation of an EGR rate does not use the Equation 1. To be more specific, in particular, if a diesel engine is used, because a position at which the EGR flow sensor 12 is disposed is separated from the combustion chamber 18, the amount of air detected by the EGR flow sensor 12 does not coincide with the amount of air inside the combustion chamber 18 particularly in the transient state (for example, at the time of acceleration or deceleration). For this reason, for the estimation of an EGR rate in such a state, an EGR rate Xegr' in the transient state is estimated by a routine constituted of blocks 1005s through 1006s. The EGR rate Xegr' is applied to the calculation thereafter. The EGR rate Xegr' at this point of time is determined as described below. First, from a speed density equation, the total gas mass Qcy1 inside the combustion chamber 18 can be determined by the following equation 2:

$$Qcy1 = (Ne \cdot Vd \cdot Pm \cdot \eta V)/(60 \cdot 2 \cdot R \cdot Tm) \quad \text{(Equation 2)}$$

where Ne: revolution speed of the engine [rpm], Vd: displacement volume, ηv: volumetric efficiency, R: gas constant, and Tm: gas temperature inside the intake pipe.

Vd and ηv can be determined by adaptability tests of engine parameters. However, the stroke volume may also be used for Vd for the sake of simplification. An output value of an intake air temperature sensor 23 is used for TM. However, Tm is not limited to this so long as means for knowing or estimating the intake air temperature provides TM. By use of the intake pressure sensor whose responsiveness is high, the total gas mass Qcy1 inside the combustion chamber 18 in the transient state could be calculated using this equation 2. Accordingly, by use of the total gas mass Qcy1 as well as the EGR mass flow rate Qegr determined by the output value of the EGR flow sensor, an estimated EGR rate Xegr' can be determined by the following equation 3:

$$Xegr' = Qegr/Qcy1 \quad \text{(Equation 3)}$$

To be more specific, an output value of the EGR flow sensor 12 is used in the calculation of an EGR rate according to the present invention; and by switching the calculation method between the transient state and the steady state, the EGR rate can be correctly calculated with high responsiveness in all cases. In this case, the EGR rate calculation by the speed density method as described in blocks 1005s and 1006s may also be used in the steady state. However, it is understood that the calculation method described in blocks 1003s and 1004s is superior to the speed density method from the viewpoint of the calculation precision if this method is used for the calculation in the steady state. Therefore, the use of the method according to the present invention is superior from the viewpoint of the combustion control of the engine.

Next, the flow of calculating in-cylinder oxygen concentration $O_2$cy1 of each cylinder of the engine 19 by use of the EGR rate determined in the flowchart shown in FIG. 4 will be described with reference to FIG. 5.

First, an EGR rate is read out in block 1011s. More specifically, as shown in FIG. 4, if the engine 19 is operating in the steady state, Xegr is applied, whereas if the engine 19 is operating in the transient state, Xegr' is applied. Only a case where Xegr is applied will be described as below for the sake of simplification. Next, in block 1012s, Qegr is used to calculate the in-cylinder air gas amount Ma and the in-cylinder EGR gas amount Megr. The new in-cylinder air gas amount Ma and the in-cylinder EGR gas amount Megr can be calculated by the following equations 4 and 5, respectively:

$$Ma = (Qa \cdot 60 \cdot 2)/(Ne \cdot \text{(the number of cylinders)}) \quad \text{(Equation 4)}$$

$$Megr = (Qegr \cdot 60 \cdot 2)/(Ne \cdot \text{(the number of cylinders)}) \quad \text{(Equation 5)}$$

However, when the engine 19 is operating in a transitional operating state, it is desirable that Qa in the equation 4 be replaced with Qcy1·(1−Xegr') instead of using the output of the airflow sensor 2. Here, in block 1013s, by use of Ma and Megr that have been determined, the oxygen concentration $O_2$a of air is read to calculate the oxygen concentration $O_2$egr of an EGR gas. It is desirable that the oxygen concentration of standard air be stored in the ECU 8 beforehand as $O_2$a. If the engine 19 is operating in the steady operation state, the exhaust gas $O_2$ concentration $O_2$exh, which has been determined from an output value of the lambda sensor 3, is used as $O_2$egr. If the engine 19 is operating in the transitional operating state, the concentration of oxygen contained in exhaust gas changes with changes in fuel injection quantity. Therefore, in consideration of the delay by piping forming the exhaust pipe and the EGR path 9, it is desirable to determine the oxygen concentration $O_2$egr using the following equation 6:

$$O_2egr' = \Sigma Ai \cdot O_2egri \text{ (where A: adaptation constant (0–1), i: combustion cycle)} \quad \text{(Equation 6)}$$

The adaptation constant A is weighted based on adaptability tests of engine parameters. As is the case with the steady state, the exhaust gas $O_2$ concentration $O_2$exh, which has been determined from an output value of the lambda sensor 3, is used as an initial $O_2$egr (i=1) at this point of time, or the exhaust gas $O_2$ concentration, which has been calculated from the fuel injection quantity obtained when i=1, may also be applied to the initial $O_2$egr (i=1).

In block 1014s, the oxygen concentration $O_2$cy1 inside the combustion chamber 18 is calculated by use of $O_2$a and $O_2$egr that have been acquired. It is desirable that this calculation use the following equations 7:

$$O_2cy1 = (Ma \cdot O_2a + Megr \cdot O_2egr)/(Ma + Megr) \quad \text{(Equation 7)}$$

Figure 5:
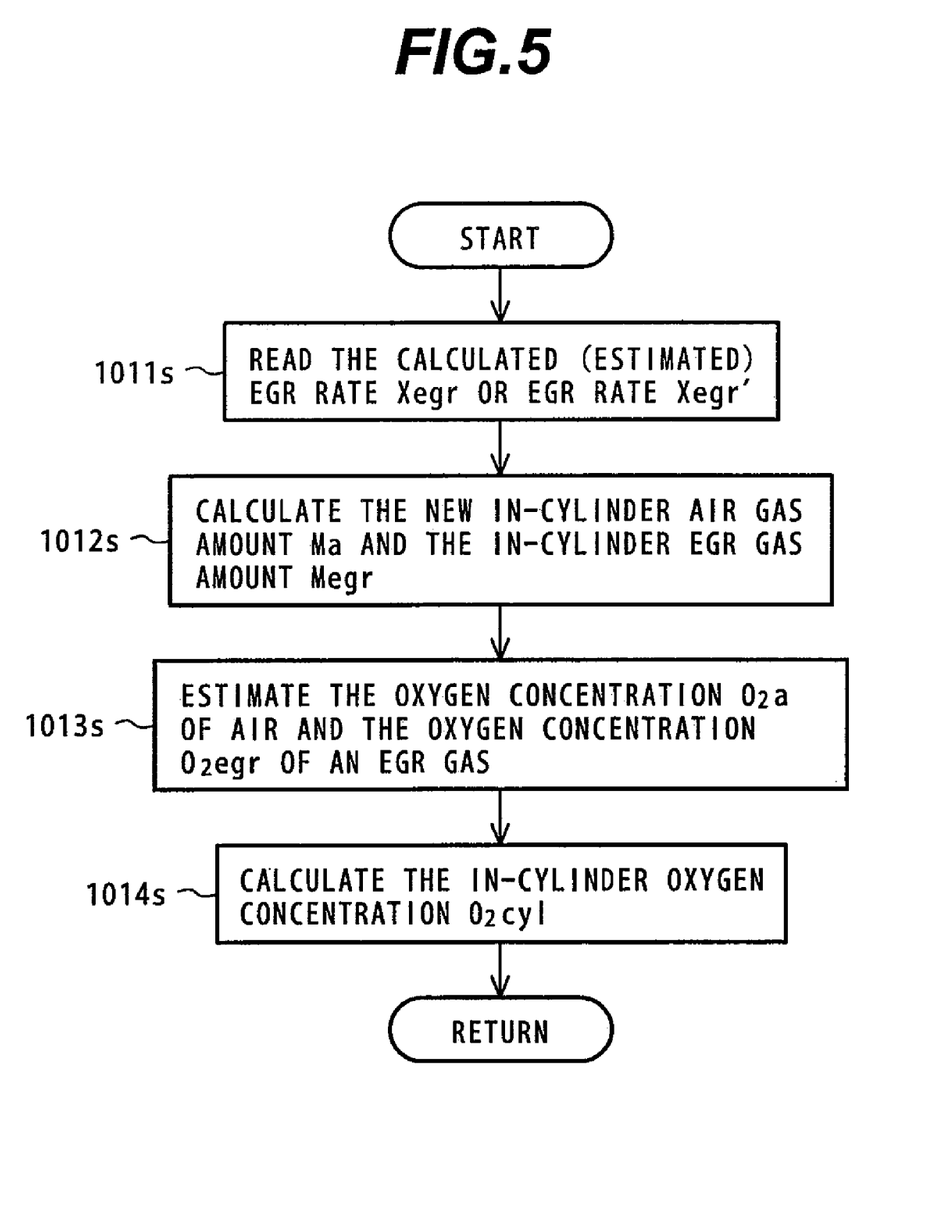
FIG. 5 is a flowchart illustrating an example of how to estimate the in-cylinder oxygen concentration according to the first embodiment of the present invention.

To be more specific, if the EGR flow sensor 12 is used for the processing according to the above flow described in FIGS. 4, 5, the EGR rate and in-cylinder oxygen concentration of the engine 19 can be calculated with high speed and high accuracy in the ECU 8 irrespective of an operation state of the engine 19.

Figure 6:
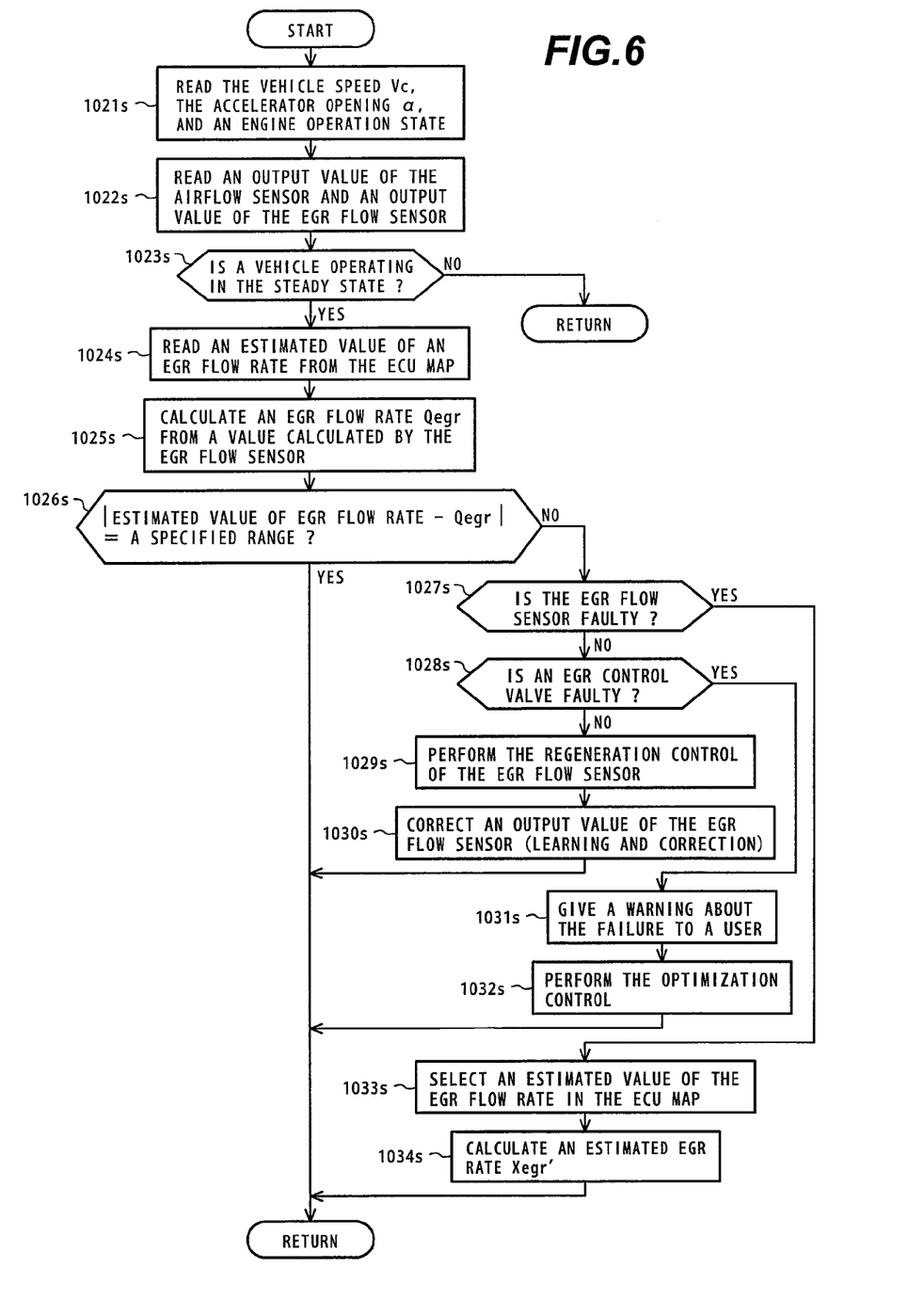
FIG. 6 is a flowchart illustrating as an example the control performed when a failure (deterioration) judgment of an EGR flow sensor, and the regeneration control thereof, are executed according to the first embodiment of the present invention.

FIG. 6 illustrates an example of a control flowchart used when a failure (deterioration) judgment of an EGR flow sensor, and the regeneration control thereof, are executed according to the first embodiment of the present invention. The EGR rate and in-cylinder oxygen concentration described with reference to drawings up to FIG. 5 are estimated entirely on the basis of output values of the EGR flow sensor 12. To be more specific, it is necessary to always monitor whether or not the detection accuracy falls within a specified range, and thereby to diagnose whether or not desired engine operation is achieved. The flow of this processing will be described as below.

First, in block 1021s, information about the vehicle equipped with the engine 19 is read. The information includes the speed Vc, the accelerator opening α, and an engine operation state. In addition, an output value of the airflow sensor 2 and that of the EGR flow sensor 12 are read (block 1022s), and a judgment is then made as to whether or not the vehicle is operating in a steady operation state (block 1023s). Fault diagnosis shown in this flow cannot be executed in the transient state. Therefore, if it is judged that the vehicle is operating in the steady operation state, the process proceeds to block 1024s where an estimated value of an EGR flow rate in this operation state is read out from a map of the ECU 8. This estimated value of the EGR flow rate is an EGR flow rate that is measured beforehand on an engine operation basis by engine bench-tests, or the like, at the time of, for example, engine adaptation. This is used as a compared value to judge whether or not the output value of the EGR flow sensor 12 is normal. Therefore, it is not always necessary to use the value read out from the map in the ECU 8 as the estimated value of the EGR flow rate in block 1024s. An EGR flow rate and an EGR rate, which are estimated in real time from information including an output value of the airflow sensor 2, an output value of the intake pressure sensor 14, the opening of the throttle 13, and the opening of the EGR control valve 11, may also be applied. Next, the process proceeds to block 1025s, and the EGR flow rate Qegr is calculated from an output value of the EGR flow sensor 12. Then, the process proceeds to block 1026s. Here, the estimated value of the EGR flow rate, which has been estimated in block 1024s, is compared with the EGR flow rate Qegr. If an absolute value of the difference between them is greater than or equal to a specified value, the process proceeds to block 1027s and later to perform the failure judgment of the EGR flow sensor 12. It is desirable that this failure judgment be made by performing real-time analysis of a change in energization characteristics and an output waveform. However, a failure judgment method is not limited to this method so long as it is a method for judging a failure of the EGR flow sensor 12. Accordingly, another method may also be selected. If it is judged in block 1027s that the EGR flow sensor 12 is faulty, the estimated value of the EGR flow rate read out in block 1024s is selected (block 1033s), and an estimated EGR rate Xegr' is then determined on the basis of this selected value. The estimated EGR rate Xegr' is applied to the control of the engine 19. If it is judged in block 1027s that the EGR flow sensor 12 is not faulty, then it is judged that there are other possible causes of the difference between the EGR estimated flow rate and the actual EGR flow rate Qegr. Accordingly, the process proceeds to block 1028s so that the failure judgment of the EGR control valve 11 is performed. It is desirable that this failure judgment be made by analyzing a position sensor signal of the EGR control valve 11 and operating characteristics thereof. However, a failure judgment method is not limited to this method so long as it is a method for judging a failure of the EGR control valve 11. Accordingly, another method may also be selected. If it is judged in block 1028s that the EGR control valve 11 is faulty, a warning about the failure is given to a user because the failure will hinder the EGR control thereafter (block 1031s). Moreover, optimization (fail safe) control is performed such that at least exhaust gas does not largely deteriorate, and at the same time, minimum vehicle traveling becomes possible (block 1032s). If it is judged in block 1028s that the EGR control valve 11 is not faulty, then it is judged that there is a high possibility of a temporary output failure of the EGR flow sensor 12 caused by fouling, or the like. Accordingly, the process proceeds to block 1029s so that fouling regeneration control of the EGR flow sensor 12 is performed. If this regeneration control method is based on a hot wire, the temperature of its surface to be measured is preferably set at 650° C. or more to burn off or evacuate fouling materials, such as soot and SOF, which adhere to the surface of the hot wire. Furthermore, output calculation logic of the EGR flow sensor 12 is corrected/learned by the EGR flow rate estimated in block 1024s (block 1030s) so that the output calculation logic can be applied to the EGR rate detection thereafter. By use of the failure judgment logic of the EGR flow sensor 12 as described above, the engine operation can be continued without largely deteriorating the combustion of the engine (exhaust gas, the fuel efficiency, the output, and the like).

Figure 7:
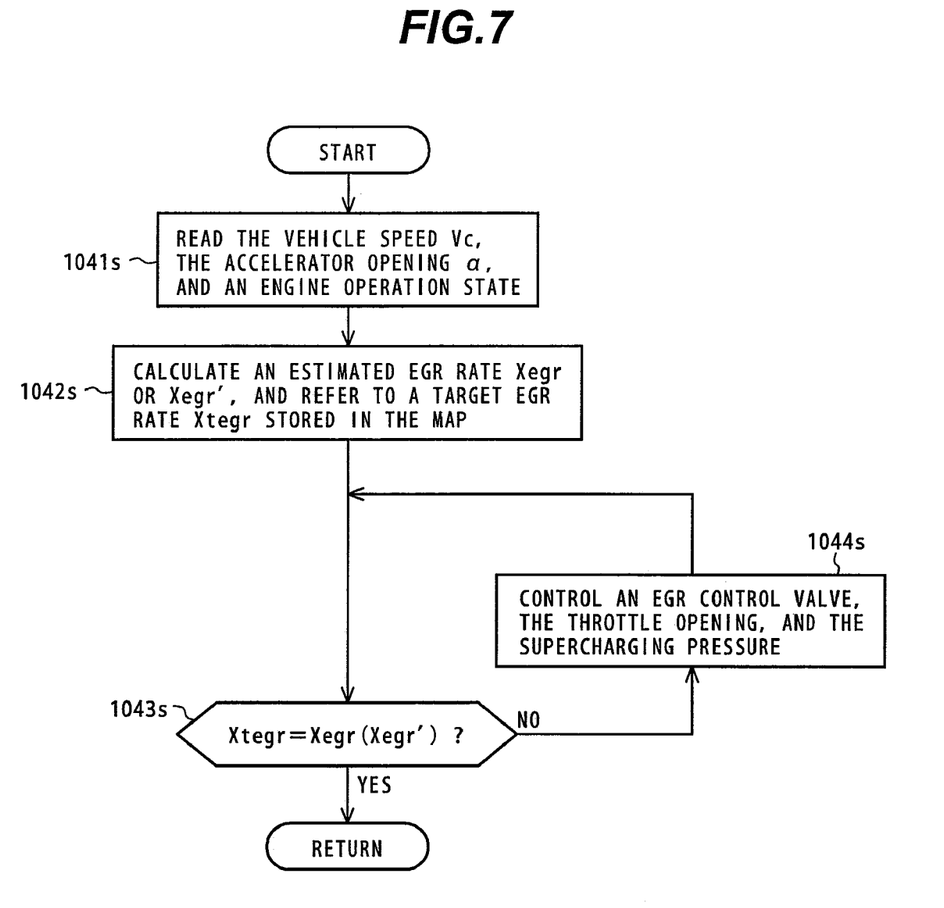
FIG. 7 is a flowchart illustrating an example of how to control an EGR rate according to the first embodiment of the present invention.

FIG. 7 is a flowchart illustrating an example of EGR rate control according to the first embodiment of the present invention. The EGR rate control is carried out to continue the most suitable engine operation by controlling each actuator of the engine so that a target EGR rate coincides with an actual EGR rate if an EGR rate map showing the target EGR rate has been written to the ECU 8. First, in block 1041s, information about the vehicle equipped with the engine 19 is read. The information includes the speed Vc, the accelerator opening α, and an engine operational state. Then, an output value of the airflow sensor 2 and that of the EGR flow sensor 12 are read to calculate an EGR rate Xegr (or Xegr'). Further, a target EGR rate Xtegr which has been written to the ECU 8 is read out. The process proceeds to block 1043s, and a judgment is made as to whether or not the current EGR rate Xegr is equivalent to the target EGR rate Xtegr. If it is judged that the current EGR rate Xegr is not equivalent to the target EGR rate Xtegr, the EGR control valve 11, the throttle 13, and the supercharger 6 are controlled (block 1044s) so that the current EGR rate Xegr is kept equivalent to the target EGR rate Xtegr. Through the processing based on this flow, the EGR rate is controlled by feedback of the EGR flow rate that has been directly detected. This makes it possible to carry out the EGR control with high speed and high accuracy. In this case, it is obvious that a target parameter may also be an EGR flow rate instead of an EGR rate.

Figure 8:
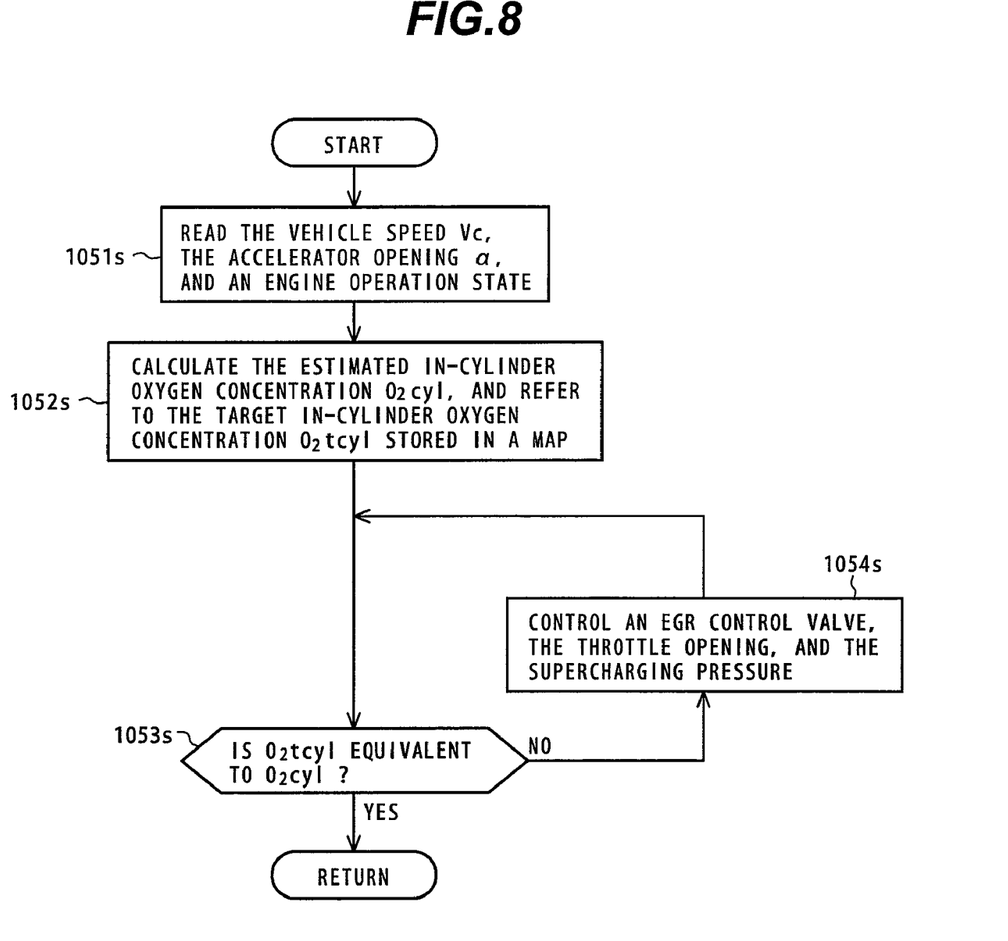
FIG. 8 is a flowchart illustrating an example of how to control the in-cylinder oxygen concentration according to the first embodiment of the present invention.

FIG. 8 is a flowchart illustrating as an example a case where the in-cylinder oxygen concentration is used as a target value according to the first embodiment of the present invention. Basically, the EGR rate Xegr described in FIG. 7 is replaced with the in-cylinder oxygen concentration $O_2cy1$; and a target EGR rate is replaced with target in-cylinder oxygen concentration $O_2tegr$. If the in-cylinder oxygen concentration is used as a target value, it is easy to achieve a reduction in man-hour at the time of engine adaptation, and the highly accurate combustion control, in a case where the in-cylinder oxygen concentration exerts a large influence on an engine operation state (for example, like the premixed combustion of a diesel engine).

Next, according to the first embodiment of the present invention, an example of a switching method for switching between a premixed combustion mode and a diffusion combustion mode will be described with reference to FIGS. 9 through 11 as an embodiment of the transient state control using the output of the EGR flow sensor.

Figure 9:
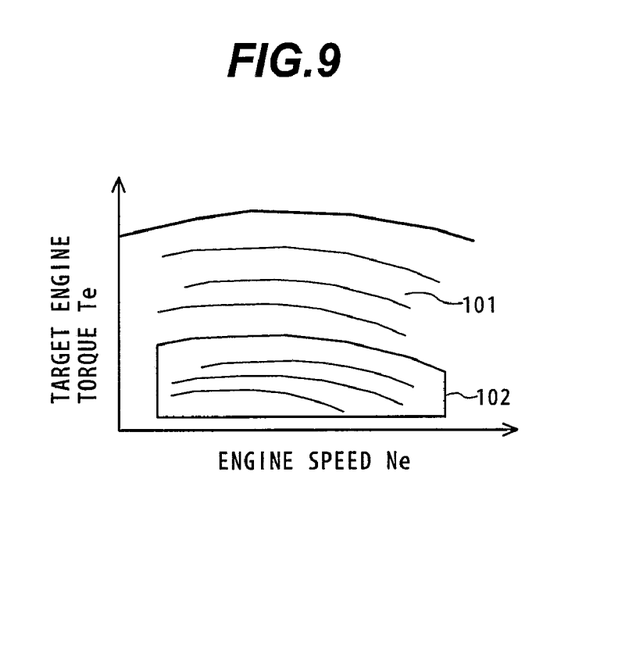
FIG. 9 is a chart illustrating an example of a map of an operation area and a target EGR rate according to the first embodiment of the present invention, the chart being formed with the engine speed on the horizontal axis and the target engine torque on the vertical axis.

First, an operation area and a target EGR rate are shown in FIG. 9 as a chart with the engine speed on the horizontal axis and the target engine torque on the vertical axis. The engine according to the present invention has a premixed combustion mode area 102 in which the combustion is started after fuel is injected into each cylinder, and a diffusion combustion mode area 101 in which the combustion is started during the fuel injection. The control amount and a target value, such as a target EGR rate, are stored in the ECU 8 beforehand. In the premixed combustion mode area 102, an in-pipe EGR rate is preferably set at 50% or more, and the fuel injection timing in which fuel is injected from the injector 5 is preferably ended before a compression top dead center. As a result, low-temperature combustion using a relatively uniform mixture gas can be achieved. This makes it possible to reduce soot and NOx exhausted from the engine. However, as a result of setting the EGR rate as described above, an operation area in this premixed combustion mode is limited as indicated with the area 102. A specific operation area will be described. The premixed combustion mode can cover an engine operation area in which the engine torque is about a half of full load, whereas the engine speed is about 4000 rpm. In the premixed combustion mode area 102, the target EGR rate is high. Therefore, the target EGR rate becomes discontinuous at a position close to a boarder line with the diffusion combustion mode area.

Figure 10:
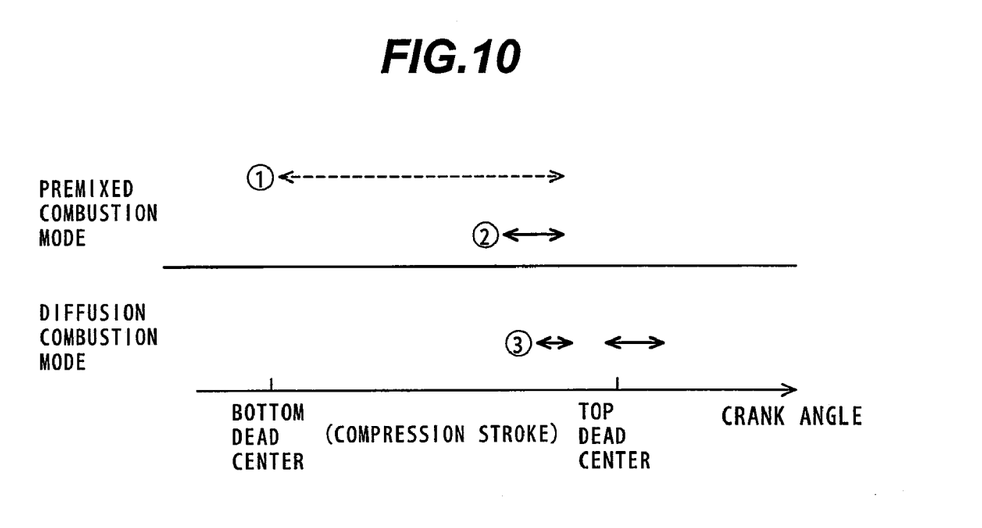
FIG. 10 is a diagram illustrating an example of the fuel injection timing in each combustion mode according to the first embodiment of the present invention.

FIG. 10 is a chart illustrating an example of the fuel injection timing in each combustion mode. As described above, in order to form a relatively uniform mixture gas in the premixed combustion mode, it is necessary to end the fuel injection preferably before the compression top dead center. For this reason, the fuel injection timing is set so that injection ends within a period (1) shown in FIG. 10 (more specifically, within a period ranging from the compression bottom dead center to the top dead center). In the premixed combustion mode according to this embodiment, from the viewpoint of ensuring the robustness of the combustion control and the uniformity of a mixture gas, the injection timing is set so that injection ends within a period (2) shown in FIG. 10 (more specifically, within a period ranging from 40 degrees to 10 degrees before the top dead center). However, a method in which injection is performed once or a plurality of times within the period (1) shown in FIG. 10 may also be adopted. In addition, in a normal diffusion combustion mode, as indicated with (3) in FIG. 10, pilot injection is performed during a compression stroke, and main injection is performed at a point of time close to the top dead center. Incidentally, it is needless to say that an injection method in which fuel injection is additionally performed once or a plurality of times in an expansion stroke and in an intake stroke also falls within the category of the injection method (3) based on the diffusion combustion mode according to this embodiment. It is necessary to switch the above-described injection timing in response to an operation area shown in FIG. 9. However, if the injection timing (3) of the diffusion combustion mode is used in a pipe whose EGR rate is a relatively high in the premixed combustion mode, the combustion starts in a state in which fuel is not sufficiently mixed with oxygen. As a result, a large quantity of soot or hydrocarbons is exhausted. In contrast with this, if the injection timing (2) of the premixed combustion mode is used in the diffusion combustion mode, oxidation of fuel easily progresses because the amount of oxygen is large. This causes the instability of combustion due to pre-ignition, and a decrease in torque. To be more specific, the switching of these combustion modes requires the application of a technology for avoiding the fluctuation of torque and the deterioration of exhaust gas, both of which occur at the time of passing through a discontinuity of a combustion mode EGR rate.

Figure 11:
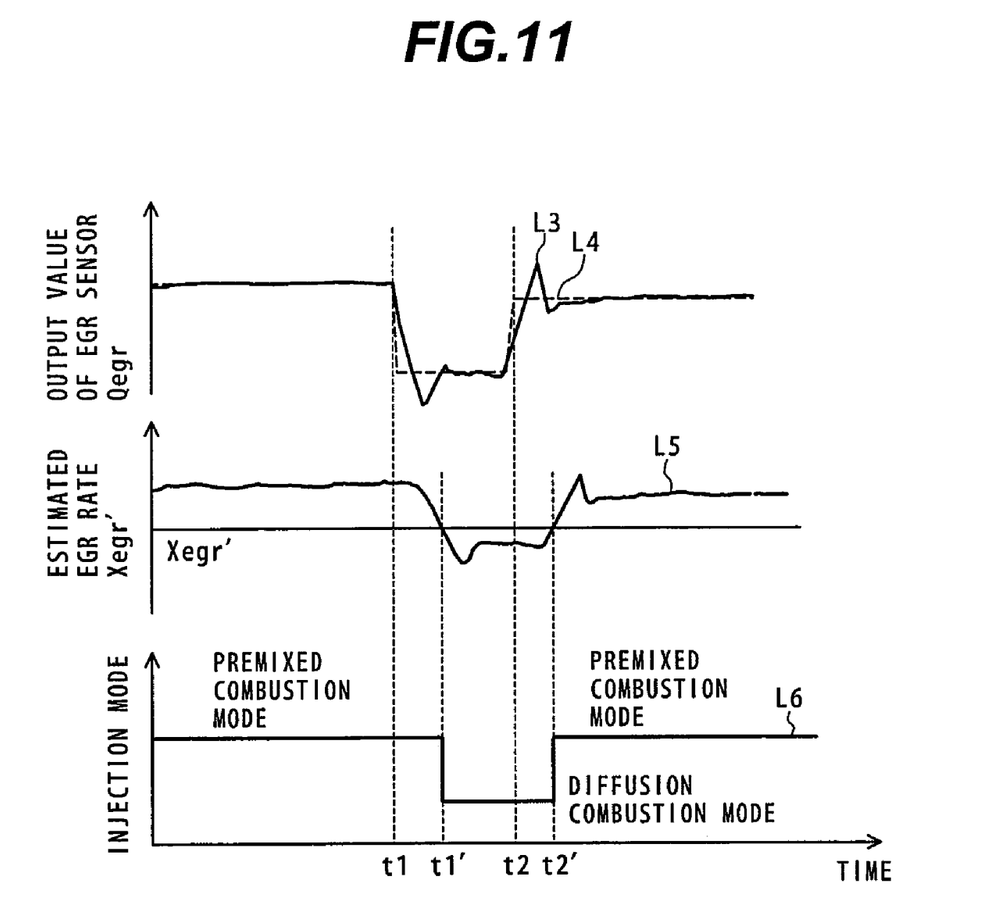
FIG. 11 is a chart illustrating, as an example, an output value of an EGR flow sensor at the time of switching a combustion mode, an estimated in-pipe EGR rate, and the injection timing.

FIG. 11 is a chart illustrating an output value of the EGR flow sensor at the time of switching a combustion mode, an estimated in-pipe EGR rate, and switching of the injection timing. To be more specific, FIG. 11 is a chart illustrating values, and the like, obtained by executing the steps of: while the engine according to the present invention operates in the premixed combustion mode, transmitting, at the time t1 from the ECU 8 to each actuator, an instruction to decrease an EGR rate to a value of the EGR rate of the diffusion combustion mode; and transmitting, at the time t2 from the ECU 8 to each actuator, an instruction to increase the EGR rate again to a value of the EGR rate of the premixed combustion mode. A line L3 indicates an output value of the EGR flow sensor 12; and a line L4 indicates its target value. Because the EGR rate is increased or decreased by controlling the throttle 13, the EGR control valve 11, the supercharger 6, and the like, the output value L3 of the EGR flow sensor 12 located in the EGR path 9 delays a little with respect to the target value L4. A line L5 in the chart indicates an estimated in-pipe EGR rate Xegr', which is calculated from an output value of the EGR flow sensor 12. In this case, because of a position at which the EGR flow sensor 12 is disposed, and because of the state quantity of components including the throttle 13, the EGR valve 11, and the supercharger 6, the line L5 of the estimated EGR rate Xegr' delays a little in comparison with the output value L3 of the EGR flow sensor 12. This embodiment has characteristics that combustion modes are switched on the basis of a value of the estimated EGR rate Xegr'. To be more specific, at the time t1' at which the estimated EGR rate Xegr' has reached a specified value Xegr'1, switching is made from the premixed combustion mode to the diffusion combustion mode; or at the time t2', switching is made from the diffusion combustion mode to the premixed combustion mode. As a result, the fuel injection timing is set in response to an actual in-pipe EGR rate. This makes it possible to suppress the deterioration of exhaust gas and the fluctuation of torque as described above.

The estimated EGR rate Xegr'1, which is used to switch the combustion mode, changes depending on operation conditions of the engine 12. However, in general, the estimated EGR rate Xegr'1 is set at a value ranging from 30% to 50%.

To be more specific, an EGR flow rate of actual flow is detected by the EGR sensor 12; and a combustion state (the fuel injection timing) is then controlled on the basis of the estimated EGR rate Xegr calculated from this output value. As a result, even in the transient operation including the acceleration and the combustion switching, engine operation with little deterioration of exhaust gas and with little fluctuation of torque can be achieved irrespective of a deterioration state of the actuator and fouling states of the engine and the pipe. It is to noted that the estimated EGR rate Xegr' used here may also be replaced with the estimate in-cylinder oxygen concentration $O_2cy1$.

Figure 12:
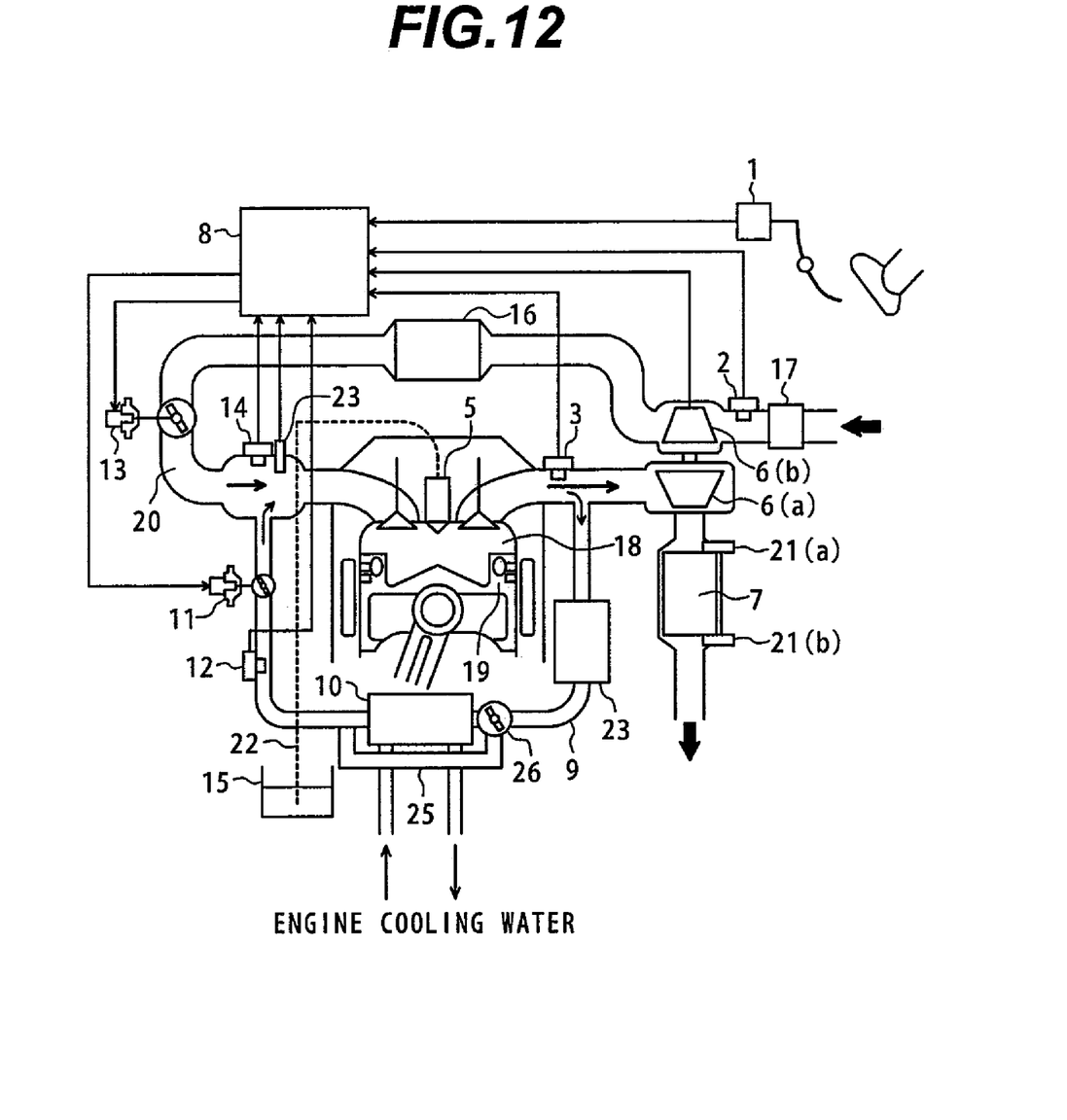
FIG. 12 is a diagram illustrating a configuration of an engine control system according to a second embodiment of the present invention.

FIG. 12 is a diagram illustrating as an example a configuration of an engine control system according to a second embodiment of the present invention. A point of difference between the engine configured in the second embodiment and the engine described in the first embodiment (shown in FIG. 1) is that the engine in the second embodiment is newly provided with a bypass 25 of an EGR cooler. This configuration makes it possible to supply the engine 19 with a hot EGR gas without using the EGR cooler 10 when a user wants to quickly warm up the engine, for example, at the time of starting up the engine, which is an advantage. The flow rate allocation to the bypass 25 and the EGR cooler 10 is performed with a valve 26. However, because the EGR gas temperature detected by the EGR flow sensor 12 differs depending on the opening of the valve 26, in order to calculate the EGR rate, and the like, described up to this time, it is necessary to measure the EGR gas temperature in a portion to be measured, and then to correct the EGR rate, and the like, by the EGR gas temperature. Therefore, in the case of this configuration, a temperature sensor (not illustrated) is disposed in the pipe constituting the EGR path 9 so as to correct the above-described EGR gas temperature. It is desirable that the position at which the temperature sensor is disposed be as close to the EGR flow sensor 12 as possible, or that the temperature sensor be formed as an integral structure. However, any temperature sensor may also be used so long as it is capable of measuring the EGR gas temperature.

Figure 13:
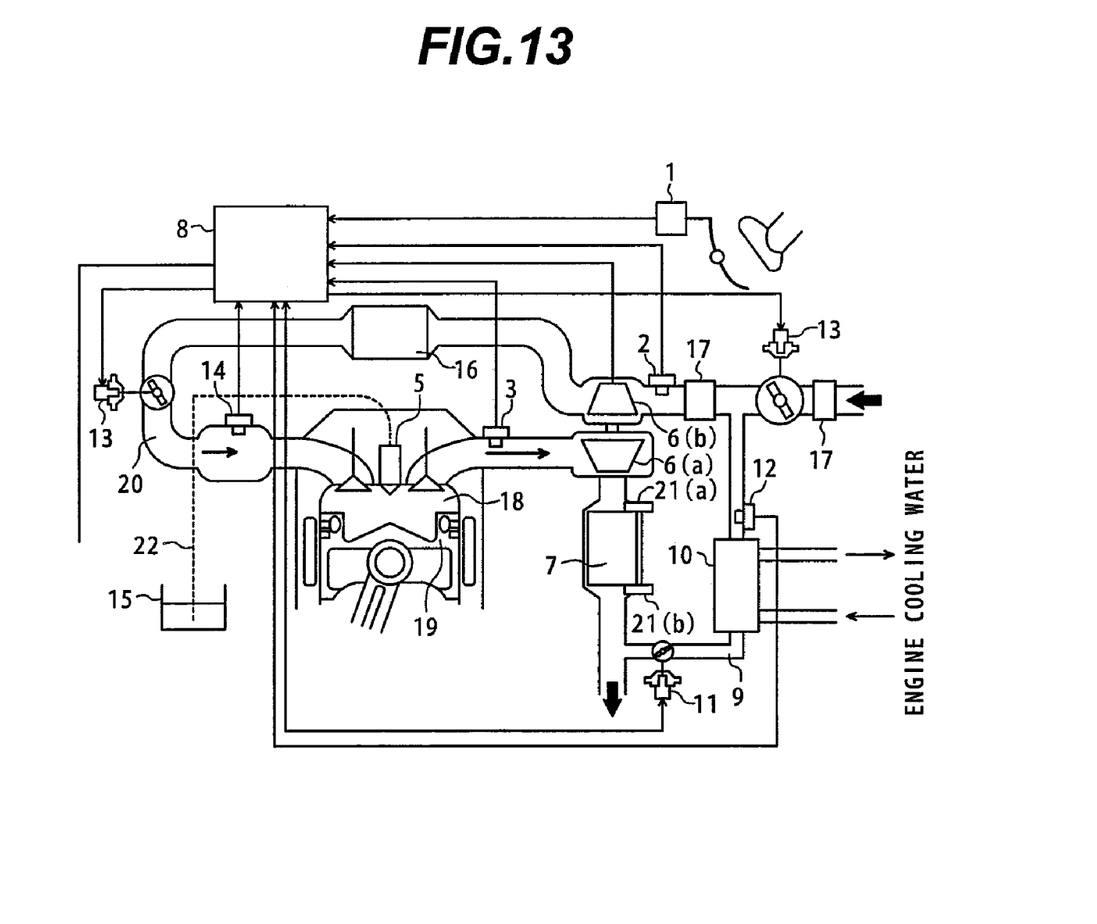
FIG. 13 is a diagram illustrating a configuration of an engine control system according to a third embodiment of the present invention.

FIG. 13 is a diagram illustrating as an example a configuration of an engine control system according to a third embodiment of the present invention. In this embodiment, in contrast to the engine configurations described in the above embodiments, the EGR path 9 functions as a flow path that connects between a point after a catalyst 7 in exhaust gas and a compressor 6(b) of the supercharger. In addition, the throttle 13 for adjusting the amount of intake air is located immediately on the downstream side of the air cleaner 17, and at the same time, on the upstream side of an intake-air-side communication entrance of the EGR path 9. In this configuration, an EGR gas which has passed through the catalyst 7 in the exhaust gas can be supplied from the upstream. Therefore, a large amount of EGR gas containing little fouling can be returned to the engine. If this configuration is employed, because the distance to the airflow sensor 2 viewed from the combustion chamber 18 of the engine is substantially the same as the distance to the EGR flow sensor 12, effects of improving the control accuracy of an EGR rate at the time of transient operation decrease. However, because the deterioration of the EGR flow sensor 12 caused by fouling is suppressed, the EGR rate and the in-cylinder oxygen concentration can be estimated with high accuracy in cooperation with the airflow sensor 2. Because this configuration makes it possible to introduce a large amount of EGR, if sensing of a gas flow rate is mainly based on the EGR, the reduction in costs may also be achieved by excluding the airflow sensor 2 from the system. However, because this point is not included in the objects intended by the present invention, detailed description thereof will be omitted.

It should be noted that in all of the above-described embodiments of the invention, the location of the EGR flow sensor 12 does not affect the embodiments in terms of their effects. Substantially the same effects can be obtained even when the EGR flow sensor 12 is disposed downstream of the EGR control valve 11 or upstream of the EGR cooler 10. The location of the EGR flow sensor 12 is not limited to the installation positions shown in the figures illustrating the embodiments, but it includes any installation position inside the pipes that constitute the EGR path 9, which is within the scope of the invention.

What is claimed is:

1. An engine control system comprising:
   intake air amount control means for controlling the amount of air taken into an engine;
   an intake airflow sensor for detecting the amount of air taken into the engine;
   an EGR path for returning part of exhaust gas, the EGR path being connected to an exhaust path and an intake path in the engine;
   an EGR flow sensor for detecting the flow rate of an EGR gas that passes through the EGR path;
   EGR flow rate control means for controlling the flow rate of the EGR gas that passes through the EGR path;
   an intake pressure sensor for detecting the pressure in an intake pipe of the engine; and
   a fuel supply unit for supplying the engine with fuel;
   wherein said engine control system further comprises:
   first EGR rate estimation means for estimating the EGR rate of the engine on the basis of the output result of the intake airflow sensor and the output result of the EGR flow sensor; and
   second EGR rate estimation means for estimating the EGR rate of the engine on the basis of the detection result of the EGR flow sensor and the detection result of the intake pressure sensor.

2. The engine control system according to claim 1, further comprising
   engine operation state judgment means for judging an operation state of the engine,
   wherein switching is made between the first EGR rate estimation means and the second EGR rate estimation means on the basis of the result of the judgment by the engine operation state judgment means, before the EGR rate is estimated.

3. The engine control system according to claim 1, wherein if it is judged, from the result of the judgment by the engine operation state judgment means, that the operation state of the engine is a steady state, the EGR flow rate control means, the intake airflow control means, and the fuel supply unit are controlled on the basis of the result of the estimation by the first EGR rate estimation means.

4. The engine control system according to claim 1, wherein if it is judged, from the result of the judgment by the engine operation state judgment means, that the operation state of the engine is a transient state, the EGR flow rate control means, the intake airflow control means, and the fuel supply unit are controlled on the basis of the result of the estimation by the second EGR rate estimation means.

5. The engine control system according to claim 1, further comprising
an engine parameter storage unit for storing control parameters of the engine,
wherein:
a target EGR rate is stored beforehand in the engine parameter storage unit on an engine operation condition basis; and
the EGR flow rate control means, the intake airflow control means, and the fuel supply unit are controlled so that the EGR rate estimated by the first EGR rate estimation means or the second EGR rate estimation means becomes equivalent to the target EGR rate.

6. The engine control system according to claim 1, wherein said EGR flow sensor is a hot-wire flow sensor disposed in the EGR path.

7. The engine control system according to claim 1, further comprising
EGR flow rate estimation means for estimating a current EGR flow rate on the basis of the each engine parameter set value stored beforehand in the engine parameter storage unit on an engine operation condition basis, and the output result of the intake airflow sensor,
wherein if it is judged, from the result of the judgment by the engine operation state judgment means, that the operation state of the engine is the steady state, a deterioration state of the EGR flow sensor is judged on the basis of the result of the estimation by the EGR flow rate estimation means.

8. The engine control system according to claim 7, wherein
if it is judged, from the result of the judgment by the engine operation state judgment means, that the operation state of the engine is the steady state, an EGR flow rate calculated from an output value of the EGR flow sensor is corrected on the basis of the result of the estimation by the EGR flow rate estimation means.

9. The engine control system according to claim 1, wherein
if the difference between the result of the estimation by the EGR flow rate estimation means and the EGR flow rate based on the result of the detection by the EGR flow sensor is larger than or equal to a specified value, the EGR rate estimation based on the first EGR rate estimation means and the second EGR rate estimation means is prohibited, and the EGR flow rate control means, the intake airflow control means, and the fuel supply unit are controlled on the basis of the result of the estimation by the EGR flow rate estimation means.

10. The engine control system according to claim 6, wherein
if the difference between the result of the estimation by the EGR flow rate estimation means and the EGR flow rate based on the result of the detection by the EGR flow sensor is larger than or equal to a specified value, the EGR rate estimation based on the first EGR rate estimation means and the second EGR rate estimation means is prohibited, and the regeneration control of the EGR flow sensor is performed.

11. The engine control system according to claim 1, further comprising
in-cylinder oxygen estimation means for estimating the in-cylinder oxygen concentration of the engine on the basis of an EGR rate estimated by the first EGR rate estimation means and the second EGR rate estimation means, or the result of the estimation by the EGR flow rate estimation means.

12. The engine control system according to claim 11, wherein
target in-cylinder oxygen concentration is stored beforehand in the engine parameter storage unit on an engine operation condition basis; and
the EGR flow rate control means, the intake airflow control means, and the fuel supply unit are controlled so that the result of the estimation by the in-cylinder oxygen estimation means becomes equivalent to the target in-cylinder oxygen concentration.

13. The engine control system according to claim 4, wherein
said engine has a premixed combustion mode in which combustion is started after fuel is injected into each cylinder, and a diffusion combustion mode in which combustion is started during the fuel injection; and
switching is made between the premixed combustion mode and the diffusion combustion mode on the basis of the result of the estimation by the second EGR rate estimation means.

14. The engine control system according to claim 13, wherein
switching is made between the fuel injection timing of the premixed combustion mode and the fuel injection timing of the diffusion combustion mode on the basis of the result of the estimation by the second EGR rate estimation means.

15. The engine control system according to claim 13, wherein
when the EGR rate estimated by the second EGR rate estimation means becomes a specified value or less, switching is made from the premixed combustion mode to the diffusion combustion mode.

16. The engine control system according to claim 13, wherein
when the EGR rate estimated by the second EGR rate estimation means becomes a specified value or more, switching is made from the diffusion combustion mode to the premixed combustion mode.

17. The engine control system according to claim 14, wherein
when the EGR rate estimated by the second EGR rate estimation means becomes a specified value or less, switching is made from the premixed combustion mode to the diffusion combustion mode.

18. The engine control system according to claim 14, wherein
when the EGR rate estimated by the second EGR rate estimation means becomes a specified value or more, switching is made from the diffusion combustion mode to the premixed combustion mode.

19. The engine control system according to claim 15, wherein
when the EGR rate estimated by the second EGR rate estimation means becomes a specified value or more, switching is made from the diffusion combustion mode to the premixed combustion mode.

* * * * *